United States Patent
Kalra et al.

(10) Patent No.: US 8,806,037 B1
(45) Date of Patent: Aug. 12, 2014

(54) REMOTE SUPPORT AUTOMATION FOR A STORAGE SERVER

(75) Inventors: Pradeep Kalra, San Jose, CA (US); Larry Lancaster, Alameda, CA (US); Ka Wai Leung, Cupertino, CA (US); Muthukumar Ratty, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 369 days.

(21) Appl. No.: 12/074,222

(22) Filed: Feb. 29, 2008

(51) Int. Cl.
*G06F 15/173* (2006.01)

(52) U.S. Cl.
USPC ........... 709/229; 709/223; 709/224; 709/225; 709/226; 709/228; 714/4.1; 714/6.12; 714/3; 714/45

(58) Field of Classification Search
None
See application file for complete search history.

(56) References Cited

U.S. PATENT DOCUMENTS

| | | | |
|---|---|---|---|
| 5,768,528 A | 6/1998 | Stumm | |
| 5,910,988 A * | 6/1999 | Ballard | 705/75 |
| 6,226,761 B1 | 5/2001 | Berstis | |
| 6,370,582 B1 * | 4/2002 | Lim et al. | 709/230 |
| 6,381,709 B1 | 4/2002 | Casagrande et al. | |
| 6,393,386 B1 | 5/2002 | Zager et al. | |
| 6,615,383 B1 | 9/2003 | Talluri et al. | |
| 6,678,835 B1 | 1/2004 | Shah et al. | |
| 6,711,612 B1 * | 3/2004 | Blumenau et al. | 709/223 |
| 6,728,897 B1 | 4/2004 | Cramer et al. | |
| 6,738,928 B1 | 5/2004 | Brown | |
| 6,741,554 B2 | 5/2004 | D'Amico et al. | |
| 6,859,462 B1 | 2/2005 | Mahoney et al. | |
| 6,973,491 B1 | 12/2005 | Staveley et al. | |
| 7,013,419 B2 | 3/2006 | Kagan et al. | |
| 7,039,828 B1 | 5/2006 | Scott | |
| 7,051,050 B2 | 5/2006 | Chen et al. | |
| 7,117,303 B1 | 10/2006 | Zayas et al. | |
| 7,263,632 B2 | 8/2007 | Ritz et al. | |
| 7,266,717 B2 * | 9/2007 | Cassell et al. | 714/6.12 |
| 7,321,982 B2 * | 1/2008 | Coatney et al. | 714/4.4 |
| 7,657,815 B2 | 2/2010 | Seidel et al. | |
| 7,693,070 B2 | 4/2010 | Rider et al. | |
| 7,783,930 B2 | 8/2010 | Gilge | |
| 7,783,932 B1 | 8/2010 | Eigen et al. | |
| 8,086,909 B1 | 12/2011 | Liu et al. | |

(Continued)

FOREIGN PATENT DOCUMENTS

WO    WO 03/005200    1/2003

OTHER PUBLICATIONS http://www.kaizo.net/releases/wp-content/uploads/whitepaper-improving-the-customer-support-experience-with-netapp-remote-support-agent.pdf "Improving the Customer Support Experience with NetApp Remote Support Agent"—Ka Wai Leung, Apr. 2008, NetApp.*

(Continued)

*Primary Examiner* — Randy Scott
(74) *Attorney, Agent, or Firm* — DeLizio Gilliam, PLLC

(57) ABSTRACT

A remote management module receives a command from a support server in response to the remote management module initiating a first secure, authenticated connection with the support server, wherein the remote management module is integrated with, and monitors a condition of, a processing system. The remote management module executes the command to generate a result that provides diagnostic data about the processing system. The remote management module reports the result to the support server upon the remote management module initiating a second secure, authenticated connection with the support server.

18 Claims, 8 Drawing Sheets

(56) References Cited

U.S. PATENT DOCUMENTS

| | | | |
|---|---|---|---|
| 2002/0032884 A1 | 3/2002 | Kobata et al. | |
| 2002/0116593 A1 | 8/2002 | Kazar et al. | |
| 2002/0194320 A1 | 12/2002 | Collins et al. | |
| 2003/0005362 A1 | 1/2003 | Miller et al. | |
| 2003/0033308 A1* | 2/2003 | Patel et al. | 707/10 |
| 2003/0135622 A1* | 7/2003 | Anderson et al. | 709/227 |
| 2003/0149771 A1* | 8/2003 | Wookey et al. | 709/227 |
| 2003/0169687 A1 | 9/2003 | Bardini et al. | |
| 2004/0205397 A1 | 10/2004 | Rajiv et al. | |
| 2004/0210591 A1* | 10/2004 | Hirschfeld et al. | 707/100 |
| 2005/0114401 A1 | 5/2005 | Conkel | |
| 2005/0120273 A1 | 6/2005 | Hudson et al. | |
| 2005/0242948 A1* | 11/2005 | Tarr | 340/539.22 |
| 2006/0112219 A1 | 5/2006 | Chawla et al. | |
| 2006/0168172 A1* | 7/2006 | Kumaran | 709/223 |
| 2006/0179188 A1* | 8/2006 | Mimatsu et al. | 710/65 |
| 2006/0200471 A1* | 9/2006 | Holland et al. | 707/10 |
| 2006/0293942 A1 | 12/2006 | Chaddha et al. | |
| 2007/0033281 A1 | 2/2007 | Hwang et al. | |
| 2007/0143827 A1* | 6/2007 | Nicodemus et al. | 726/2 |
| 2007/0244987 A1* | 10/2007 | Pedersen et al. | 709/217 |
| 2008/0005609 A1* | 1/2008 | Zimmer et al. | 714/5 |
| 2009/0006920 A1 | 1/2009 | Munson et al. | |
| 2009/0070649 A1 | 3/2009 | Aldana et al. | |
| 2009/0271681 A1 | 10/2009 | Piret et al. | |

OTHER PUBLICATIONS http://download.springer.com/static/pdf/713/art%253A10.1023%252FA%253A1011408108941.pdf?auth66=1394813887_26d30acb6b7e0f9e5dfe186a2afb6bb3&ext=.pdf "A Monitoring Sensor Management System for Grid Environments" Tierney et al, UC Berkeley, Apr. 2001.*

U.S. Appl. No. 11/741,656, filed Apr. 27, 2007, 49 pages, "System and Method for Rapid Identification of Coredump Disks During Simultaneous Take Over", Susan M. Coatney, et al.

U.S. Appl. No. 11/789,237, filed Apr. 24, 2007, 72 pages, "Automatic Generation of Core Files and Automatic Generation of Support Information With Generation of Core Files", Michael David Harris.

U.S. Appl. No. 11/789,185, filed Apr. 24, 2007, 55 pages, "Non-Disruptive Generation of Core Files Without Reboot", Michael David Harris.

U.S. Appl. No. 11/074,229, filed Mar. 4, 2005, 34 pages, "Configuring a Remote Management Module in a Processing System", Mark W. Insley, et al.

U.S. Appl. No. 11/073,260, filed Mar. 4, 2005, 40 pages, "Method and Apparatus for Boot Image Selection and Recovery Via a Remote Management Module", Mark Insley, et al.

U.S. Appl. No. 11/258,628, filed Oct. 25, 2005, 48 pages, "Method and Apparatus for Management and Troubleshooting of a Processing System", Steven D. Yee, et al.

U.S. Appl. No. 11/746,873, filed May 10, 2007, 40 pages, "Method and Apparatus for Generating Dynamic Microcores", David J. Eigen, et al.

Leung, "Improving the Customer Support Experience with NetApp Remote Support Agent", Apr. 2008, NetApp, pp. 1-10.

Kevin, "Kevin's FAQ Page", Oct. 2, 2006, University of Waterloo, pp. 1-16.

Digital, "DECnet-Plus for OpenVMS Network Management", Feb. 12, 1996, Digital Equipment Corporation, pp. 1-16.

Tierney, "A Monitoring Sensor Management System for Grind Environments", Apr. 28, 2001, Kluwer, pp. 1-10.

* cited by examiner

REMOTE SUPPORT AUTOMATION FOR A STORAGE SERVER

TECHNICAL FIELD

Embodiments of the present invention relate to remote support for a processing system, and more specifically to automating remote support for a storage server.

BACKGROUND

In many types of computer networks, it is desirable to be able to perform certain management related functions (e.g., configuring, performing diagnostic functions, debugging, software upgrades, etc.) on a computer or other form of processing system from a remote location. One important management function is troubleshooting the processing system to prevent errors and/or fix errors that have occurred.

One particular application in which it is desirable to have this capability is in a storage-oriented network, i.e., a network that includes one or more storage servers that store and retrieve data on behalf of one or more storage clients. Such a network may be used, for example, to provide multiple users with access to shared data or to backup mission critical data. An example of such a network is illustrated in FIG. 1.

FIG. 1 illustrates a conventional network architecture 100, in which a conventional customer environment 105 is connected with a conventional enterprise environment 110 via a public network 145, such as the Internet. The conventional customer environment 105 includes a conventional storage server 115, a storage subsystem 155, a network 125, one or more storage clients 160, a support console 120, an administration console 165 and a firewall 130 (e.g., a firewall located at a customer site). The conventional enterprise environment 110 can be an environment of, for example, a service provider (e.g., a technical support service provider), and includes a conventional support server 135 connected with a firewall 140. Firewall 140 can be located at an enterprise site, such as a support service enterprise site. The support console 120 disposed within the conventional customer environment 105 enables the conventional storage server 135 to provide remote support services to the conventional storage server 115 via the public network 145.

Referring to the conventional customer environment 105, the conventional storage server 115 is coupled locally with storage subsystem 155, which may include a set of mass storage devices managed by the conventional storage server 115. The mass storage devices in the storage subsystem 155 may be, for example, conventional magnetic disks, optical disks such as CD-ROM or DVD based storage, magneto-optical (MO) storage, or any other type of non-volatile storage devices suitable for storing large quantities of data, and may be organized into one or more volumes of Redundant Array of Inexpensive Disks (RAID).

The conventional storage server 115 is connected with support console 120 and the one or more storage clients 160 via network 125. The conventional storage server 115 operates on behalf of the storage clients 160 to store and manage shared files or other units of data (e.g., blocks) in the set of mass storage devices. Each of the storage clients 160 may be, for example, a conventional personal computer (PC), workstation, or the like.

Administrative console 165 is coupled to the conventional storage server 115 via a communication port (e.g., RS-232) and a transmission line that allow direct communication between the conventional storage server 115 and the administrative console 165. This configuration enables a network administrator to perform management functions on the conventional storage server 115. However, in many network environments, the network administrator may not be able to perform such functions as identifying potential problems before they occur and troubleshooting potential or existing problems. This may be because the network administrator may not have a complete understanding of certain processing systems (e.g., conventional storage system 115) on the network, which may be manufactured by third parties. Often, in order to solve hardware and software issues with the processing systems, the network administrator must contact the third party manufacturer.

To address this issue, some conventional customer environments 105 include support console 120. Support console 120 can identify potential problems of the conventional storage server 115 based on preset thresholds. The support console 120 may also cause a notification to be sent to conventional support server 135 if a problem is identified. However, in order for support console 120 to properly troubleshoot the conventional storage server 115, it must be correctly configured by a storage administrator for the conventional customer environment 105 in which it is to operate. Such configuration can be time consuming and difficult, and is often performed incorrectly. Failure to correctly configure the support console 120 may reduce the effectivity of the support console 120, or render it inoperable for its intended purpose. Moreover, since the support console 120 is external to the conventional storage server 115, there are many errors that are not detectable by the support console 120. For example, the support console 120 can detect that no health status message has been received from the conventional storage server 115, but cannot determine whether this is because the conventional storage server 115 has been disconnected from the network, or because the conventional storage server 115 has crashed. Therefore, there are errors that are not diagnosable by the support console 120.

Some conventional servers 115 include a conventional remote management module (RMM) 150. The conventional RMM 150 is often in the form of a dedicated circuit card separate from the other elements of the host conventional storage server 115 that has a network interface that connects to the network 125 and a separate internal interface that connects to one or more components of the conventional storage server 115. The conventional RMM 150 typically includes control circuitry (e.g., a microprocessor or microcontroller) which is programmed or otherwise configured to respond to commands received from a local administrator or support console 120.

However, the conventional RMM 150 can only provide remote support via the support console 120, or via a connection to a storage client 160 or administrative console 165 within the conventional customer environment 105. For the conventional RMM 150 to provide support, a support technician or the support console 120 must log in to the conventional RMM 150 from within the conventional customer environment 105. The conventional RMM 150 cannot initiate connections with any external computing devices, whether such computing devices are within the conventional customer environment 205 or external to the conventional customer environment 205. Nor does the conventional RMM 150 have a capability to communicate with the conventional support server 135. Moreover, the conventional RMM 150 also cannot communicate with the conventional storage server 115 to request access to logs, configuration files, core files, etc. stored by or on the conventional storage server 115.

SUMMARY

A remote management module resides on a storage server. A support server sends commands to the remote management module to repair the storage server when it encounters problems. The support server can send commands to the remote support module because the remote management module periodically connects to the support server. The remote management module generates results when it executes the received commands. The remote management module sends these results back to the support server. This enables the support server to fix problems on the storage server from a remote location.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for providing remote support to a processing system. In one embodiment, a remote management module resides on a storage server. A support server sends commands to the remote management module to repair the storage server when it encounters problems. The support server can send commands to the remote support module because the remote management module periodically connects to the support server. The remote management module generates results when it executes the received commands. The remote management module sends these results back to the support server. This enables the support server to fix problems on the storage server from a remote location.

The present invention includes various steps, which will be described below. The steps of the present invention may be implemented by specially-designed hardware components or may be implemented by a programmable hardware device executing machine-executable instructions. Alternatively, the steps may be performed by a combination of these approaches.

At least portions of the present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Overview of The Invention

Figure 1:
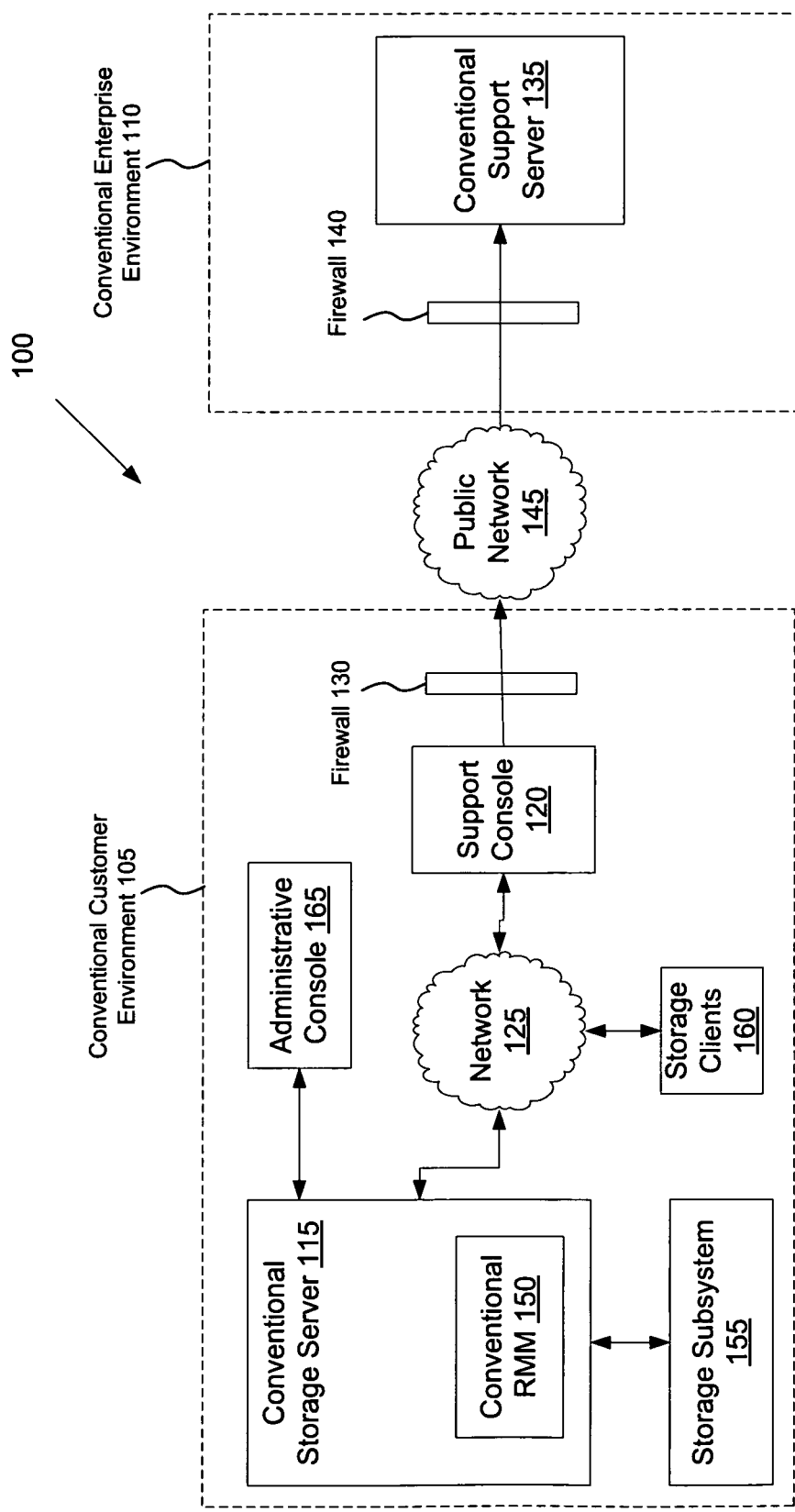
FIG. 1 illustrates a conventional network architecture.
Figure 2:
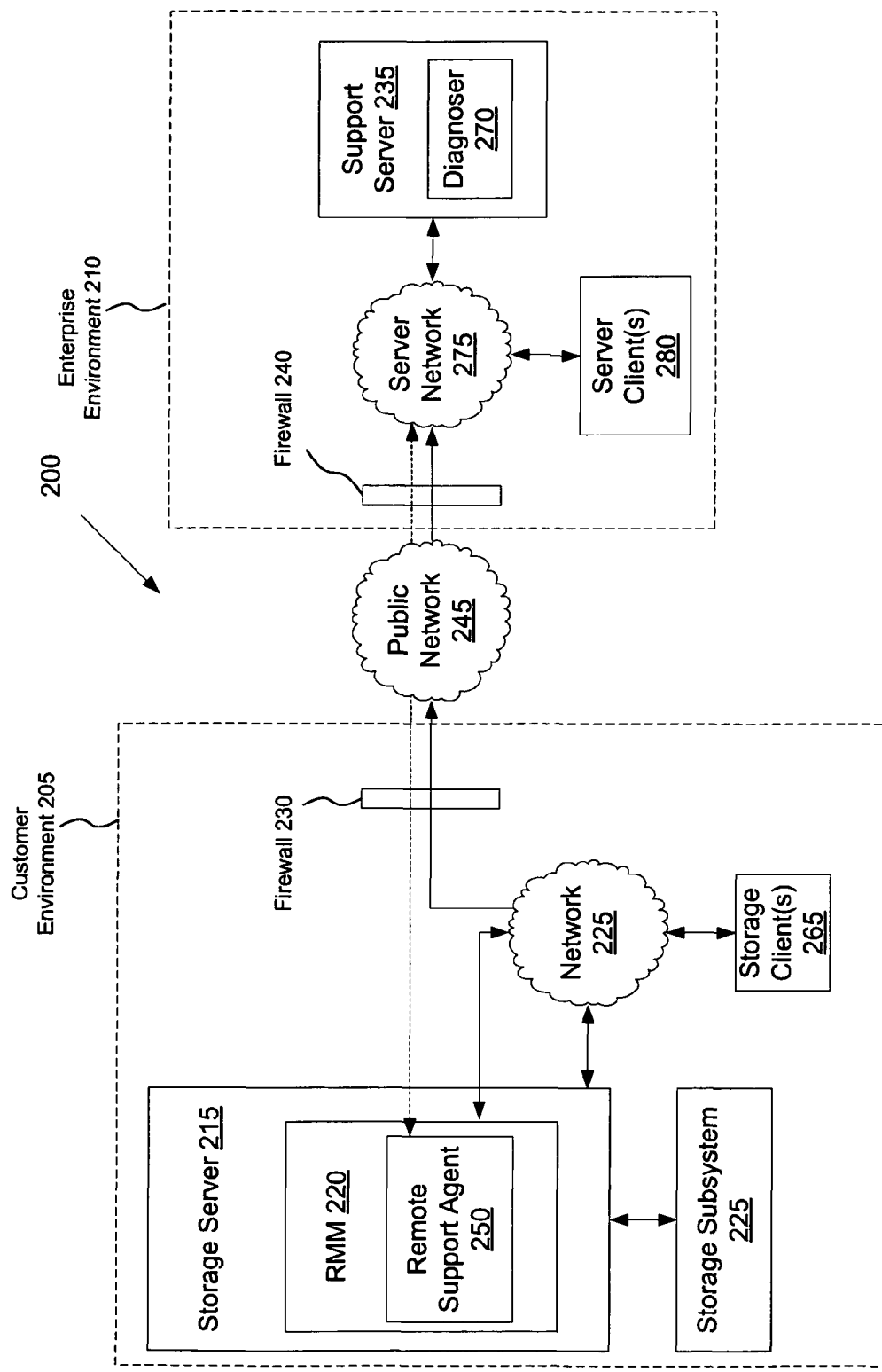
FIG. 2 illustrates an exemplary network architecture, in which embodiments of the present invention can operate.

FIG. 2 illustrates an exemplary network architecture 200, in which embodiments of the present invention can operate. The network architecture 200 includes a customer environment 205 connected with a enterprise environment 210 via a public network 245 (e.g., the Internet). In one embodiment, the customer environment 205 includes a storage server 215 connected with a storage subsystem 225, and further connected with one or more storage clients 265 and a firewall 230 via a network 225.

Storage server 215 can provide file-level access (e.g., as provided by network attached storage (NAS), block-level access (e.g., as provided by a storage area network (SAN), or a combination of file-level access and block-level access to data. Storage server 215 manages storage subsystem 225, making it available to storage clients 265 (e.g., desktop computers, laptop computers, servers, terminals, etc.) for writing and reading data. Storage server 215 includes a remote management module (RMM) 220 which includes a remote support agent 250.

Referring to FIG. 2, the RMM 220 is designed to provide enough information to determine when and why the storage server 215 fails, even by providing log information beyond that provided by the operating system of the storage server 215 (e.g., hardware event logs, hardware sensor state logs, etc.). This functionality includes the ability to send a notice to a remote support server 235 on its own initiative, indicating that the storage server 215 is not operational, even when the storage server 215 is unable to do so. The RMM 220 is further designed to operate independently of the storage server 215. Hence, the RMM 220 runs on standby power and/or an independent power supply, so that it is available even when the main power to the storage server 215 is off.

In one embodiment, the RMM 220 maintains a heartbeat communication with the storage server. The heartbeat communication is a periodic message exchanged between the RMM 220 and the storage server 215 indicating that each is functioning properly. If an expected heartbeat message is not received by the RMM 220, the RMM 220 times out, and issues a notification to the support server 215 that the storage server 215 is no longer operational.

Remote support agent 250 enables remote management module 220 to establish secure, authenticated connections with support server 235 via the public network 245, and through the firewall 230 (located at the customer environment 205) and the firewall 240 (located at the enterprise environment 210). Authentication may be achieved using standard authentication mechanisms, such as by using public key pairs, one time passwords, security tokens, etc. Secure connections may be established by using secure communication protocols. For example, the remote support agent 250 may support use of Hypertext Transport Protocol (Secure) (HTTPS), Secure Shell Protocol (SSH), Socket Secure (SOCKS) Protocol, Secure Sockets Layer (SSL), and so on.

In one embodiment, the remote support agent 250 is configured to establish connections with the support server 235 on a periodic basis. An interval of the periodic basis is provided by the support server 235. If no problems or alarms have been detected, the interval for the periodic connections is relatively large (e.g., every 5 minutes, every 10 minutes, etc.). However, if an alarm or error is detected in the storage server 215, the frequency of the periodic connections may be increased (e.g., to once every 1 second, once every 5 seconds, etc.). This permits the support server 235 to provide commands for the remote support agent 250 and receive reports from the remote support agent 250 on a much more frequent basis when necessary. The interval may also be increased or decreased based on commands received from support server 235, whether or not an alarm or error is detected.

When remote support agent 250 connects with the support server 235 for the first time after boot-up, the remote support agent 250 reports all relevant information regarding the storage server 215 (e.g., a configuration of the storage server, thresholds, managed storage subsystems 225, hardware identification such as system serial number and model number, a version number of the remote support agent, a security policy, etc.) On subsequent connections, the remote support agent 250 may only report on changed conditions of the storage server 215. This reduces network traffic without impairing an ability of the support server 235 to diagnose problems of the storage server 215. Remote support agent 250 is described in greater detail below with reference to FIG. 3.

Returning to FIG. 2, firewall 230 regulates the flow of traffic between public network 245 and network 225. Firewall 230 is configured to permit remote support agent 250 to establish connections with support server 235.

When storage server 215 is initially added to network 225, the storage server 215 is configured. Configuration includes attaching and configuring storage subsystem 225, setting up system storage policies, assigning network policies, etc. In one embodiment, RMM 220 is automatically configured by the operating system of the storage server 215 when the storage server 215 is configured, based on the configuration of the storage server 215. In another embodiment, administrative commands that configure the storage server 215 are automatically applied to the RMM 220. Examples of such commands include commands that set a network address of the storage server 215 and commands that assign security settings to the storage server 215. Other exemplary commands include commands that designate autosupport settings, assign simple network management protocol (SNMP) settings, set up authentication credentials (e.g., user ID, passwords, etc.), etc. In one embodiment, storage server 215 automatically copies and forwards commands to RMM 220 upon receiving them. In another embodiment, RMM 220 intercepts commands directed to storage server 215, copies the commands, and forwards them on to storage server 215. The RMM 220 may then apply such commands as they were provided to the storage server 215, or modify such commands based on a known relationship between the RMM 220 and the storage server 215. For example, a command that assigns security settings to the storage server 215 may automatically assign the same security settings to the RMM 220. The known relationship may include, for example, a known relationship between a network address of the RMM 220 and the storage server 215 (e.g., a fixed offset between an IP address of the RMM 220 and an IP address of the storage server 215). For example, a command that assigns a network address to the storage server 215 may automatically assign a different network address to the RMM 220 based on the relationship between the storage server 215 and the RMM 220, No additional configuration is required to enable the RMM 220.

In one embodiment, the enterprise environment 210 includes a support server 235, firewall 240 and one or more clients 280 connected via a server network 275, which may be a local area network (LAN), wide area network (WAN), etc. Firewall 240-regulates the flow of traffic between public network 245 and server network 275. Firewall 240 is configured to permit access to support server 235 by remote support agent 250.

Support server 235 is a computing device or application that performs support services for storage server 215. Support server 235 in one embodiment provides support services for multiple storage servers, which may be on the same network (e.g., network 225), or on different networks. In one embodiment, support server 235 includes a diagnoser 270.

Diagnoser 270 is an application or dedicated logic circuit that receives reports of alarms, and diagnoses such alarms. In one embodiment, diagnoser 270 generates a "support case" when a new alarm is reported. A "support case" is a data file that identifies the storage server and the alarm, and is populated with information pertaining to the storage server (e.g., log files, ASUPs, core files, etc.) as such information is gathered. The support case has a status, which remains "open" until a problem that caused the alarm is resolved.

Diagnoser 270 issues commands to a remote support agent 250 that reported an alarm to direct the remote support agent 250 to gather and report information (e.g., log files, system core, etc.) relating to the alarm. Diagnoser 270 may use the gathered information to automatically diagnose the alarm based on a data store of known alarms and error signatures. The data store may be a database (e.g., a relational database, hierarchical database, network database, etc.), a flat file system, etc. If the error cannot be automatically diagnosed, a technical support user may be notified to investigate the error. Diagnoser 270 is described in greater detail below with reference to FIG. 5.

Returning to FIG. 2, clients 280 are computing devices (e.g., desktop computers, laptop computers, personal digital assistants (PDAs), etc.) that are operated by technical support users. Clients 280 may permit a technical support user to log into support server 235 locally or remotely, and may enable technical support users to post commands on the support server 235 to be issued to remote support agent 250. Technical support users may also log in directly to the support server 235 (e.g., via an administration console or terminal).

Though FIG. 2 illustrates a storage server 215, and a support server 235 that provides support services to a support server 215, the methods and systems introduced herein can be equally applied to essentially any other type of network-connected processing system, such as a SAN host, a switch, a network caching appliance, a host bus adapter, a Fabric Attached Storage (FAS) device and so on.

Detailed Description of Customer Environment

Figure 3:
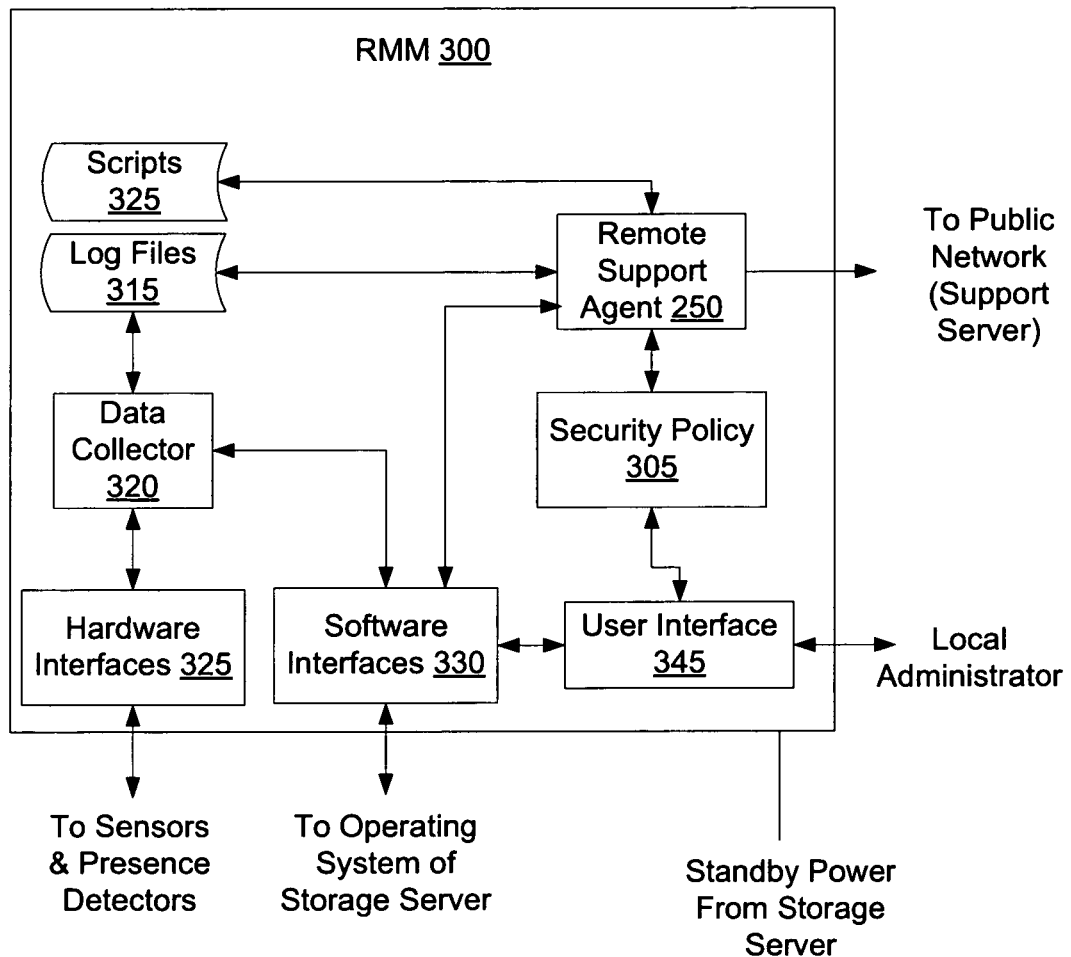
FIG. 3 illustrates a high-level block diagram showing the relevant logic components, modules and/or objects of an RMM, according to certain embodiments of the present invention.

FIG. 3 is a high-level block diagram showing the relevant logic components, modules and/or objects of an RMM 300, according to certain embodiments of the present invention. In one embodiment, RMM 300 corresponds to RMM 220 shown in FIG. 2.

Referring to FIG. 3, RMM 300 includes control circuitry (e.g., a microprocessor, microcontroller, logic circuit, etc.) which is programmed or otherwise configured to respond to commands received from a support server (e.g., support server 500 of FIG. 5) via a network, and to perform troubleshooting and other diagnostic functions on the storage server.

The RMM 300 can be used to perform these functions regardless of whether the storage server is in an operable or inoperable state.

The various components of the RMM 300 may be implemented on a dedicated circuit card installed within a storage server (e.g., storage server 215 of FIG. 2). Alternatively, the RMM 300 may include dedicated circuitry that is part of, but electrically isolated from other elements of, a storage server.

In one embodiment, the RMM 300 includes, a data collector 320, one or more logs 315 and script files 325, a security policy 305, and a remote support agent 250. In one embodiment, each of the data collector 320, security policy 305 and remote support agent 250 includes hardware logic executed by a microcontroller, field programmable gate array (FPGA), application specific integrated circuit (ASIC), or other dedicated processing unit. In another embodiment, one or more of the data collector 320, a security policy 305 and remote support agent 250 can include software and/or firmware logic executed by a central processing unit that runs an operating system that may be the same or different from an operating system run on a storage server. Alternatively, one or more of the data collector 320, a security policy 305 and remote support agent 250 can be implemented as a series of state machines (e.g., an internal logic that knows how to perform a sequence of operations), logic circuits (e.g., a logic that goes through a sequence of events in time, or a logic whose output changes immediately upon a changed input [i.e., sequential logic or combinational logic]), or a combination of a state machines and logic circuits.

In one embodiment, RMM 300 includes hardware interfaces 325 and software interfaces 330 that couple the RMM 300 to the storage server. Hardware interfaces 325 include dedicated circuitry and/or software that monitors data collected by sensors (used to detect changes in the state of various environmental variables in the storage server, such as temperatures, voltages, binary states, etc.) and presence detectors (used to detect the presence or absence of various components within the storage server, such as a cooling fan, a particular circuit card, etc.). Software interfaces 330 include software that interacts with an operating system of the storage server, and enables a direct communication between the RMM 300 and the storage server. Software interfaces 330 send queries and receive reports from the operating system of the storage server on a condition of the storage server, usage statistics, and other information. Examples of data collected from the software interfaces 330 include data associated with storage server failure, volume threshold, processor utilization threshold, core files, log files, and so on.

Software interfaces 330 and hardware interfaces 325 can be used together to detect an alarm (e.g., failure), as well as a cause of the failure. For example, software interfaces 330 and hardware interfaces 325 may be able to detect that the storage server is inoperative, and deduce that a particular hardware error has caused the storage server to become inoperative. This provides improved troubleshooting of the storage server as opposed to troubleshooting performed by an external support console used for remote support automation, as more data is available to the tightly coupled RMM 300.

Data collector 320 collects data regarding an operation and/or condition of the storage server. The data may be collected from hardware interfaces 325 and software interfaces 330. In one embodiment, the data collector 320 is configured to collect data at regular intervals for trend and threshold analysis.

In one embodiment, data collector 320 monitors the storage server for alarms by comparing collected data to threshold values. An alarm occurs when the collected data exceeds the threshold values. For example, an alarm may be triggered when a temperature exceeds a threshold temperature of 60 degrees Celsius. An alarm may also occur, for example, when a storage server fails, a switch goes offline or becomes faulty, a host bus adapter (HBA) does not respond, etc. If an alarm is detected, data collector 320 sends a notification of the alarm to the remote support agent 250. In one embodiment, the data collector 320 also creates and sends a file that includes data (e.g., log files 315) associated with the alarm to the remote support agent 250. In an alternative embodiment, instead of the data collector 320 notifying the remote support agent 250 of the alarm, the remote support agent 250 periodically polls the data collector 320 and/or log files 315 to determine if an alarm has occurred.

The data collector 320 stores collected data in a database or in log files 315, which may be stored in a local memory (not shown). Log files 315 can include debug logs, application log files, console logs, hardware event logs, hardware sensor state logs, logs of software detected errors, and so on. Once log files 315 reach a specified size (e.g., once a memory that stores log files 315 is filled), oldest data in the log files 315 may be overwritten with new data. In one embodiment, data that is overwritten in the log files 315 is first backed up to a backup storage (e.g., to a storage module managed by storage server 300). As with log files 315 stored in local memory, log files stored in backup storage may be accessed as necessary (e.g., for troubleshooting purposes).

Remote support agent 250 provides remote diagnostic support for the storage server. In one embodiment, remote support agent 250 provides an interface to a support server through which diagnostics can be performed. In a further embodiment, remote support agent 250 establishes a periodic connection to a support server, reports on conditions of the storage server, and receives and executes commands from the support server. Remote support server 250 can report, for example, information gathered by the software interfaces 325 and hardware interfaces 330, such as log files, data requested from the storage server, configuration files, etc. The remote support agent 250 can perform management functions such as, for example, monitoring various functions and operating conditions in the storage server, configuring the storage server, performing diagnostic functions on and debugging the storage server, upgrading software on the storage server, etc. Such management functions may be performed based on commands received from the support server.

When remote support agent 250 is notified of an alarm, remote support agent 250 initiates a connection with the support server and notifies the support sever that the alarm has occurred. For example, remote support agent 250 may issue a notification to support server if it detects that the storage server is down (e.g., it has crashed or otherwise stopped serving data). In this way, the remote support agent 250 can notify the support server of impending or current problems with the storage server as they occur. In one embodiment, remote support agent 250 notifies the support server that the alarm has occurred without providing any additional information. Alternatively, remote support agent 250 may further send any available data (e.g., log files 315) associated with the event to the support server. This permits the support server to immediately begin diagnosing the alarm.

Remote support agent 250 may request and/or receive commands upon establishing a connection with the support server. Commands may be downloaded from a command queue at the support server in a first in first out (FIFO) basis, or according to other methodologies (e.g., last in first out (LIFO), etc.). Commands commonly direct remote support agent 250 to execute one or more scripts 325.

Scripts 325 cause remote support agent 250 to perform one or more directed action. Scripts 325 may cause the remote support server 250, for example, to mine data from the data collector 320, to gather log files 315, to request data from storage server, etc. Scripts 325 may also include general infrastructure scripts that cause remote support agent 250 to perform such tasks as copying core files from a designated storage server, moving or renaming core files into standard access locations, and so on. Some scripts may cause the remote support agent 250 to perform corrective or preventative actions such as updating software or modifying a configuration of the storage server or RMM 300. Scripts 325 may be stored on the RMM 300 (e.g., in local memory) such that received commands can identify the script (e.g., by a unique script lD). Scripts 325 may also be included in the command received from the support server. Scripts 325 that are included in received commands may be stored on RMM 300 for future processing.

Under certain conditions, remote support agent 250 may direct storage server to issue an autosupport notification (ASUP). Storage servers manufactured by Network Appliance, Inc. have the capability of sending autosupport notifications, such as via email or Hypertext Transport Protocol (HTTP) or Hypertext Transport Protocol (Secure) (HTTPS). Autosupport notifications may include data associated with the health of the storage server, data associated with any problems detected by the storage server, and additional data. Commonly, ASUPs include a full range of data to facilitate troubleshooting a current or pending problem. For example, ASUPs may include all diagnostic logs available to the storage server. Remote support agent 250 may direct the storage server to issue an ASUP when an application or system crash is detected, on receipt of a command from the support sever requesting an ASUP, or according to other criteria. Remote support agent 250 may send a direct communication to the storage server (e.g., via software interfaces) directing the storage server to issue an ASUP. Alternatively, remote support agent 250 may direct the storage server to issue an ASUP by logging into the storage server via the network (e.g., using a telnet/rsh protocol), by sending an email notification to the support server, etc.

In one embodiment, remote support agent 250 provides remote console sessions for interactive access to the RMM 300. Interactive remote console sessions can be tunneled over an HTTPS protocol between the remote support agent 250 and the support server. Once established, any commands permitted by the security policy 305 and access control can be implemented. Such commands may include, for example, maintenance commands, diagnosis commands, repair commands, etc.

In one embodiment, the remote support agent 250 can communicate with the storage server to gain access to all or portions of a core file (e.g., system core file and/or application core file) at the storage server. A core file is a binary image of the storage server runtime (or application runtime) that is created at the storage server when certain errors or problems occur, such as when the storage server fails or when a program aborts abnormally. The core file contains a dump of the storage server's core memory at the time of the error or failure. Core files are very useful in debugging problems, as they provide an image of the process that failed at the time of failure.

Core files typically include hundreds or thousands of compressed chunks, each of which is individually compressed and labeled with a header. In one embodiment, remote support agent 250 can respond to commands from the support server to fetch specified portions (chunks) of the core file. Remote support agent 250 can then send those specified chunks of the core file instead of sending the complete core file, which can be up to several gigabytes in size. This can considerably reduce an amount of time necessary to diagnose a cause of an alarm that lead to a core dump.

In a further embodiment, the remote support agent 250 can automatically begin uploading chunks of a core file when a system panic (e.g., system crash) is detected. The remote support agent 250 can first transmit headers of all chunks. The remote support agent 250 can subsequently begin uploading the chunks of the core file to the support server in sequential order until commands to upload specified chunks of the core file are received.

Security policy 305 can be established by an administrator of the storage server to secure the RMM 300. Security policy 305 can enable or disable remote access to the RMM 300, and can further control degrees of remote access. In one embodiment, security policy 305 checks communications between the remote support agent 250 and support server. Accordingly, only those communications that are approved by policies set by an administrator of the storage server are allowed.

Security policy 305 is used to set up appropriate policies and permissions for the remote support agent 250. Accordingly, actions taken by the remote support agent 250 are covered by security policies that are set by the user of the storage server. Security policies may restrict scripts that can be run, log files that can be accessed or saved, data that can be requested from storage server, and so on. Security policies may also determine whether RMM 300 can communicate with storage server directly (e.g., using software interfaces), or whether RMM 300 must communicate with support server through a network via a network adapter of the RMM 300. An administrator may require such indirect communication, for example, to ensure that network traffic policies apply to communications between the RMM 300 and the storage server. Security policies enable enhanced security since only permitted data regarding the storage server can be collected and transmitted to the support server, only permitted actions can be performed on the storage server, and only approved communication channels can be used.

Security policy 305 may further be responsible for security and authentication procedures used to communicate with support server. Security policy 305 may require that secure connections be achieved by using HTTPS, SSL, or other secure communication protocols. Security policy 305 may also require that specified authentication procedures be used. For example, security policy 305 may require that authentication be achieved using public key pairs, one time passwords, or other authentication procedures.

In one embodiment, RMM 300 includes a user interface 345. User interface 345 may be a command line interface or graphical user interface through which a local administrator may issue commands to the RMM 300 and/or remote support agent 250. The local administrator may also access log files 315 and scripts via the user interface 345. Moreover, the local administrator may modify settings of the security policy 305 via the user interface 305.

Figure 4:
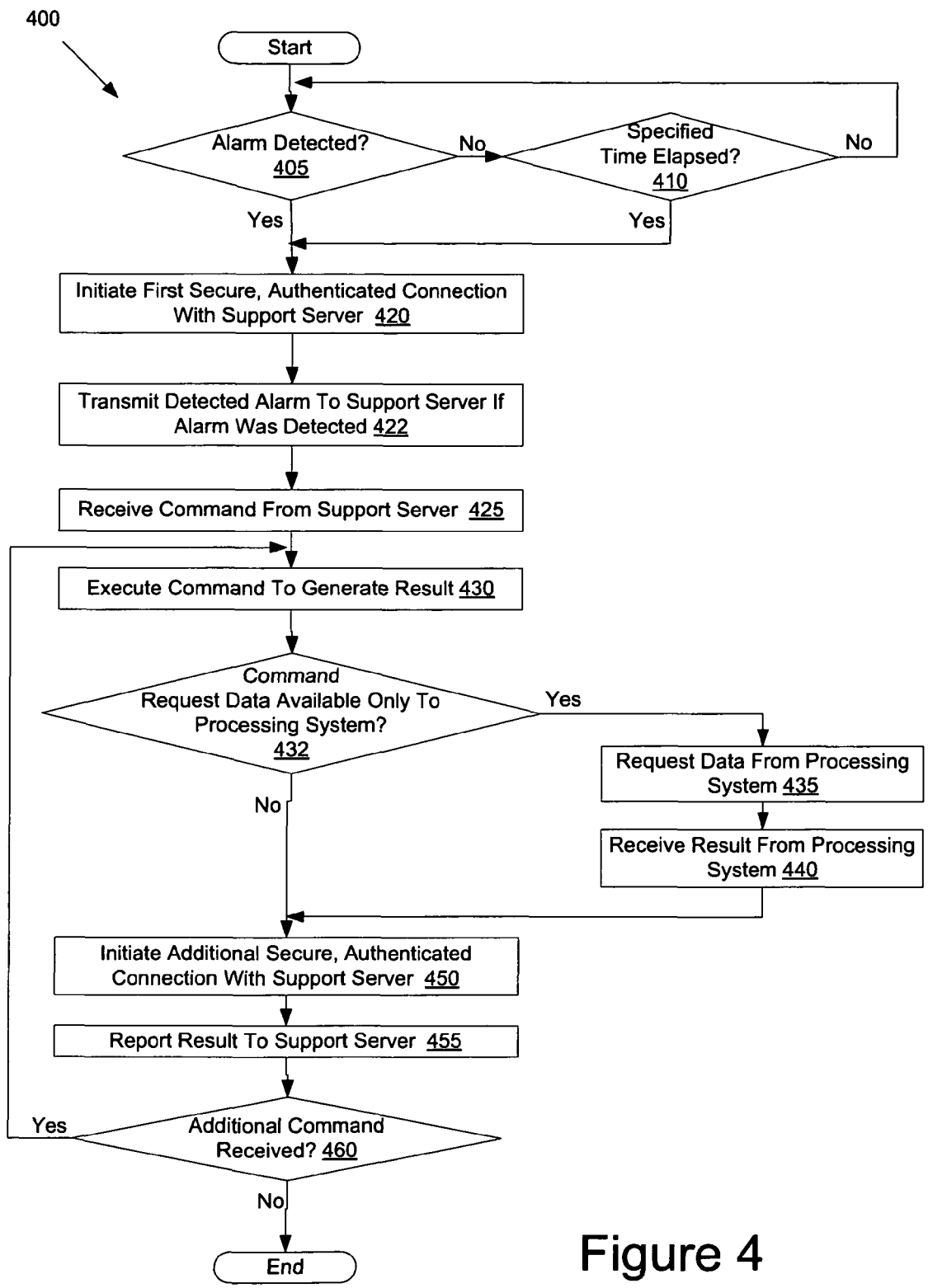
FIG. 4 is a flow diagram illustrating one embodiment of a process for providing remote automated support to a processing system such as a storage server.

FIG. 4 is a flow diagram illustrating one embodiment of a process 400 for providing remote automated support to a processing system such as a storage server. The process may be performed by processing logic that comprises hardware (e.g., circuitry, dedicated logic, programmable logic, microcode, etc.), software (e.g., instructions run on a processing device to perform hardware simulation), or a combination thereof. In one embodiment, process 400 is performed by RMM 300 of FIG. 3. In accordance with certain embodiments of the invention, RMM 300 provides a support server with information to enable proactive diagnosis of potential and current problems with a storage server (e.g., storage server 300 of FIG. 3), so as to enable troubleshooting of problems quickly if and when they do occur.

Referring to FIG. 4, process 400 includes processing logic determining whether an alarm has been detected (block 405). A detected alarm may be a timeout (e.g., a storage server failed to respond to a status inquiry), or may be based on detection of a condition that merited generation of an alarm. In one embodiment, a data collector of an RMM (e.g., data collector 320 of FIG. 3) determines whether an alarm has occurred. In another embodiment, a remote support agent (e.g., remote support agent 250 of FIG. 3), determines whether an alarm has occurred. An alarm may be detected, for example, if gathered data is detected to exceed threshold values (e.g., if a temperate of the processing system is too high), if a processing system has crashed, etc. If an alarm has not been detected, the process proceeds to block 410. If an alarm has been detected, the process proceeds to block 415.

At block 410, processing logic determines whether a specified period of time has elapsed. The time period may be specified by a support server (e.g., support server 235 of FIG. 2). If the specified time period has not elapsed, the process proceeds to block 405. If the specified time period has elapsed, the process continues to block 420.

At block 420, a first secure, authenticated connection is initiated with the support server by a remote management module (RMM). In one embodiment, the connection is established by a remote support agent (e.g., remote support agent 250 of FIG. 3) of the RMM. The connection may be, for example an HTTPS or SSL connection, and may be authenticated using public key pairs, one time passwords, etc. In one embodiment, processing logic determines whether a security policy authorizes connections with a support server before initiating the first secure, authenticated connection. The security policy may be maintained, for example, by security policy 305 of FIG. 3, and may prohibit connections to remote devices, or may prohibit specific type of connections to remote devices. If the security policy does not authorize connections to support server, no connection may be established therewith.

At block 422, the detected alarm is transmitted to the support server if an alarm was detected. An alarm may be detected, for example, if one or more conditions are detected to occur (e.g., by a data collector or remote support agent). Such conditions may be stored as business rules by, for example, data collector 320 or remote support agent 250 of FIG. 3. Examples of alarms include, an unresponsive storage server alarm (e.g., triggered if no response is received from the storage server), a slow network connection speed alarm (e.g., triggered if a ping result is too high), a failed disk drive alarm (e.g., triggered if the storage server reports a failed disk drive), etc. In one embodiment if an alarm was detected, upon establishing the first connection processing logic sends data associated with the alarm to the support server. The support server may thereby immediately begin diagnosing a cause of the alarm.

At block 425, a command is received from the support server by the RMM. In one embodiment, the command is received by a remote support agent of the RMM. The command may be a command to run one or more scripts accompanying the command and/or stored at the RMM. The scripts may cause the remote support agent to gather logs, messages, configuration data, or other diagnostic information. In one embodiment, the invoked scripts are checked by a security policy prior to execution to determine if execution of the scripts is authorized. At block 430, the command is executed (e.g., by the remote support agent) to generate a result. The result may include, for example, gathered logs, messages, etc.

At block 432, processing logic (e.g., the remote support agent) determines whether the command requested data that is available only to the processing system. Examples of such information include a core file stored at the processing system, configuration files of the processing system, etc. If the command did request data available only to the processing system, the process continues to block 435. If the command did not request any such data, the process proceeds to block 450.

At block 435, processing logic (e.g., the remote support agent) requests data from the processing system that was identified in the command. At block 440, the requested data is received. The process then continues to block 450

At block 450, an additional secure, authenticated connection is initiated by the RMM (or remote support agent within the RMM) with the support server. At block 455, the result (e.g., gathered logs, configuration files, etc.) is reported to the support server.

At block 460, it is determined whether any additional commands were received during the additional secure, authenticated connection with the support server. If additional commands were received, the process proceeds to bock 430, and the additional commands are executed. If no additional commands were received, the process ends. Process 400 may be repeated continuously to provide constant remote support automation to a processing system.

Detailed Description of Enterprise Environment

Figure 5:
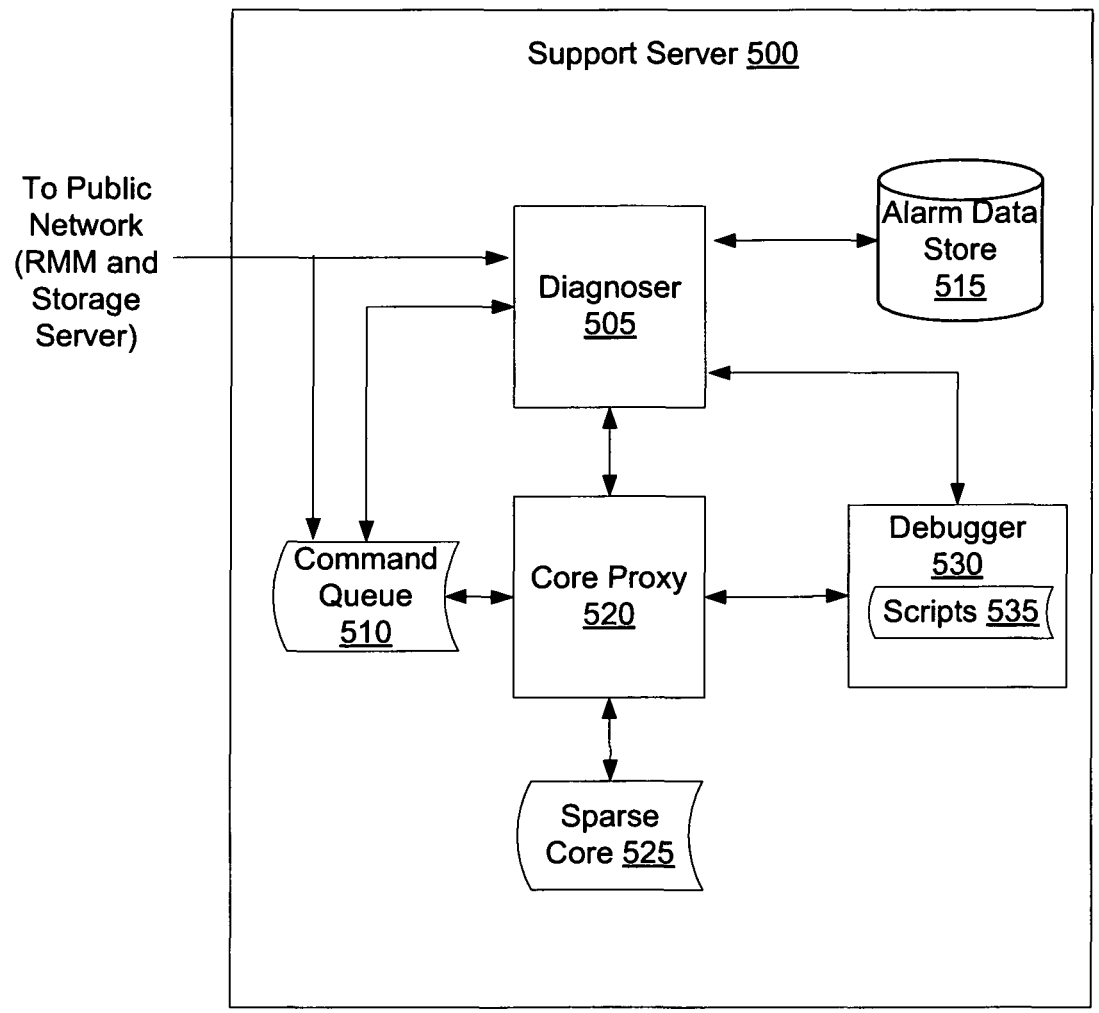
FIG. 5 illustrates a high-level block diagram showing relevant components of the support server, according to certain embodiments of the invention.

FIG. 5 illustrates a high-level block diagram showing relevant components of the support server 500, according to certain embodiments of the invention. Support server 500 may include hardware and/or software (e.g., a web server application). Support server 500 may be implemented as, or run on, a clustered active-active configuration to provide high availability and increased performance. Alternatively, support server may be implemented as, or run on, a non-clustered configuration. Support server 500 includes a diagnoser 505 and core proxy 520, each of which may be a logic executed by a microcontroller, a field programmable gate array (FPGA), an application specific integrated circuit (ASIC), a logic executed by a central processing unit, a series of state machines, one or more logic circuits, or a combination thereof.

Diagnoser 270 receives reports of alarms from remote support agents, and diagnoses such alarms. When an alarm is initially reported, diagnoser 270 opens a new support case (e.g., by generating a new support case file and/or folder, adding an entry in a support case table for the new support case, etc.), identifying a storage server that experienced the alarm and the nature (e.g., classification) of the alarm. Diagnoser 270 further determines capabilities of the remote support agent (e.g., by examining a remote support agent capability table or by querying the remote support agent). Determining the capabilities of the remote support agent can include determining policies enforced by the RMM (e.g., by a security policy of the RMM), and determining whether the RMM includes a remote support framework. For example, when a storage server is initially set up, configuration settings and security policies of the RMM may be reported to the support server and stored in a data store (not shown). This information may be examined by the diagnoser 270 to determine how to communicate with the RMM. The initial report of an alarm may include some information pertaining to the alarm, such as relevant log files, and ASUP, etc. Such information may have been automatically collected by the remote support agent upon detecting the alarm. Alternatively, the initial report may only notify diagnoser 505 of an alarm condition.

When a remote support agent reports an alarm, diagnoser 505 issues a command to the remote support agent to increase a frequency of connections with the support server 500. The frequency of connections may be increased, or example, from 1 every ten minutes to 1 every half second. This facilitates quick response time of the remote support agent while an alarm is being diagnosed. Once the alarm is diagnosed, the connection frequency may be reduced.

Diagnoser 505 is connected with an alarm data store 515 that includes alarm profiles and signatures for multiple alarms that have previously been diagnosed. The alarm data store 515 may be a database (e.g., a relational database, hierarchical database, network database, etc.), a flat file system, etc. Diagnoser 505 can compare any received information pertaining to the alarm to entries in the alarm data store 515. If no match is found based on presently possessed information, diagnoser 505 determines what additional information is necessary to diagnose the alarm. Commands are posted in a command queue 510 that direct the remote support agent that reported the alarm to gather such additional information (e.g., log files, system core, etc.). The commands may be scripts that, when run by the remote support agent, cause the remote support agent to collect the specified log files, request information from a storage server, perform a test procedure, etc. For example, a command may include a script that causes the remote support agent to upload all log files having a specified time stamp to the support server 500. When the remote support agent next establishes a connection with support server 500, it downloads commands from the command queue, and executes such commands remotely. On a subsequent connection, the remote support agent reports information gathered by running the commands. Diagnoser 505 then uses this additional information to continue to attempt to diagnose the alarm. This process may repeat numerous times, as diagnoser 505 determines additional data to be gathered by remote support agent. Support server 500 may, for example, determine that an error was caused by a specified disk drive managed by a storage server, and request additional information about that disk drive. Such a determination may be made by comparing already gathered information to entries in the alarm data store 515, by running diagnosis scripts at diagnoser 505 that identify the disk drive as a probable error source, by a support technician that has examined already received information, etc.

If the diagnoser 505 is unable to automatically diagnose an alarm using the alarm data store 515, diagnoser 505 notifies a technical support user that user interaction is necessary. A technical support user may then examine the gathered information and manually troubleshoot the alarm. Such manual troubleshooting may include the technical support user placing additional commands on the command queue 510 that direct the remote support agent to gather still additional information.

Support server 500 in one embodiment generates a graphical user interface (GUI) that facilitates diagnoses of support cases by a technical support user. The graphical user interface may display, for example, a configuration summary of the remote support agent, a configuration summary of the storage server, a log of recent activity, file upload history, etc. The GUI may also include a list or dropdown menu of common log files or other diagnostic information that user may want to request from the remote support agent.

Once an alarm is diagnosed, corrective procedures can be implemented (e.g., necessary fixes may be made to storage server), after which the support case can be closed. In one embodiment, diagnoser 505 generates a set of instructions that, when executed by a remote support agent, will cause the remote support agent to automatically correct the conditions that caused the alarm, or to provide an administrator with a series of steps to perform through a command console to correct the alarm conditions (e.g., to walk the administrator through a resolution). The set of instructions may include one or more scripts, which can be placed on the command queue 510 for the remote support agent to retrieve. The scripts may be generated by the diagnoser 505 based on received configuration information of the storage server that produced the alarm, software versions of the storage server, the reported alarm and/or a repository of corrective actions (which can be stored in the alarm data store 515). Such scripts may also be generated even when no alarms are detected. Such scripts may optimize the storage server and/or update software (e.g., apply patches) on the storage server to prevent future alarms.

If the resolved alarm is a new alarm that was not present on the alarm data store 515, a new entry may be added to the alarm data store 515. If the alarm occurs on a storage system thereafter, the alarm may be automatically diagnosed by comparing it to the new entry.

In one embodiment of the present invention, if the alarm reported by the remote support agent is a system panic (e.g., a crash), the remote support agent provides diagnoser 505 with a "mini-core" and a stack trace at the time of failure. A "mini-core" is a small file that is a signature of the actual core file. Diagnoser 505 compares the mini-core and stack trace to mini-cores and stack traces stored in the alarm data store 515. Such mini-cores and/or stack traces may have been entered into the alarm data store 515 when a previous alarm associated with a mini-core and/or stack file was diagnosed. Each time a new problem is diagnosed, a new entry (which may include a new alarm core and/or stack file) can be made in the alarm data store 515. If the mini-core matches a mini-core in the alarm data store 515, a cause of the system panic can be automatically determined by the diagnoser 505. If the mini-core does not match a mini-core stored in the alarm data store 515, diagnoser 505 initializes the core proxy 520 and a debugger 530, and posts a command in the command queue 510 for the remote support agent to begin uploading the core file. When the remote support agent next connects to support server 500, it receives the command and begins sequentially uploading chunks of the core file.

In one embodiment, the remote support agent first uploads a list of all core files available on the storage server. The list may further identify all available chunks of the available core files. In one embodiment, the remote support agent also uploads headers of all available chunks that identify compressed and uncompressed chunk sizes.

Debugger 530 may be a source level debugger that offers extensive facilities for tracing and altering the execution of programs or applications. Debugger 530 allows a user or application to monitor and modify values of a program's internal variables as the program executes, to recreate a system state that caused a core dump and/or otherwise facilitate diagnosing alarms. Debugger 530 runs scripts 535 that request specific chunks of the core file for debugging. As scripts 535 analyze requested chunks of the core file, they may determine additional chunks of the core file that also need to be examined. Scripts executed on the debugger 530 continue to examine additional chunks of the core file until a cause of a system panic is determined. Some scripts 535 may automatically analyze chunks of the core file without user input. Other scripts 535 may receive user input directing the scripts 535 to analyze specified chunks of the core file.

In general, debugger 530 only functions if an entire core file is available. However, in one embodiment, the core proxy 520 generates a sparse core 525 that includes less than an entire core file. Core proxy 520 then acts as an intermediary between the sparse core 525 and the debugger 530, and represents the sparse core 525 to the debugger as if it were a whole core file.

When the debugger 530 attempts to access a specific chunk of the core file, core proxy 520 examines the sparse core 525 to determine if that specific chunk of the core file is present. If it is present, core proxy 520 forwards that specific chunk of the core file to the debugger 530. If the specified chunk of the core file is not present, the core proxy 520 posts a command on the command queue 510 for the remote support agent to upload the specified chunk. When the specified chunk is uploaded, the core proxy 520 places it in the sparse core 525, and forwards that chunk to the debugger 530. This process continues until a cause of the system panic is determined. Once remote support agent has uploaded all specified chunks, it resumes sequentially uploading core file chunks until the core file is completely uploaded or the system crash has been diagnosed.

A cause of a system crash can be determined without uploading an entire core file. This can reduce an amount of time required to diagnose a system panic, and reduce network traffic. This can be especially useful given that generally only about 10% of a core file is necessary to diagnose a system crash.

Figure 6:
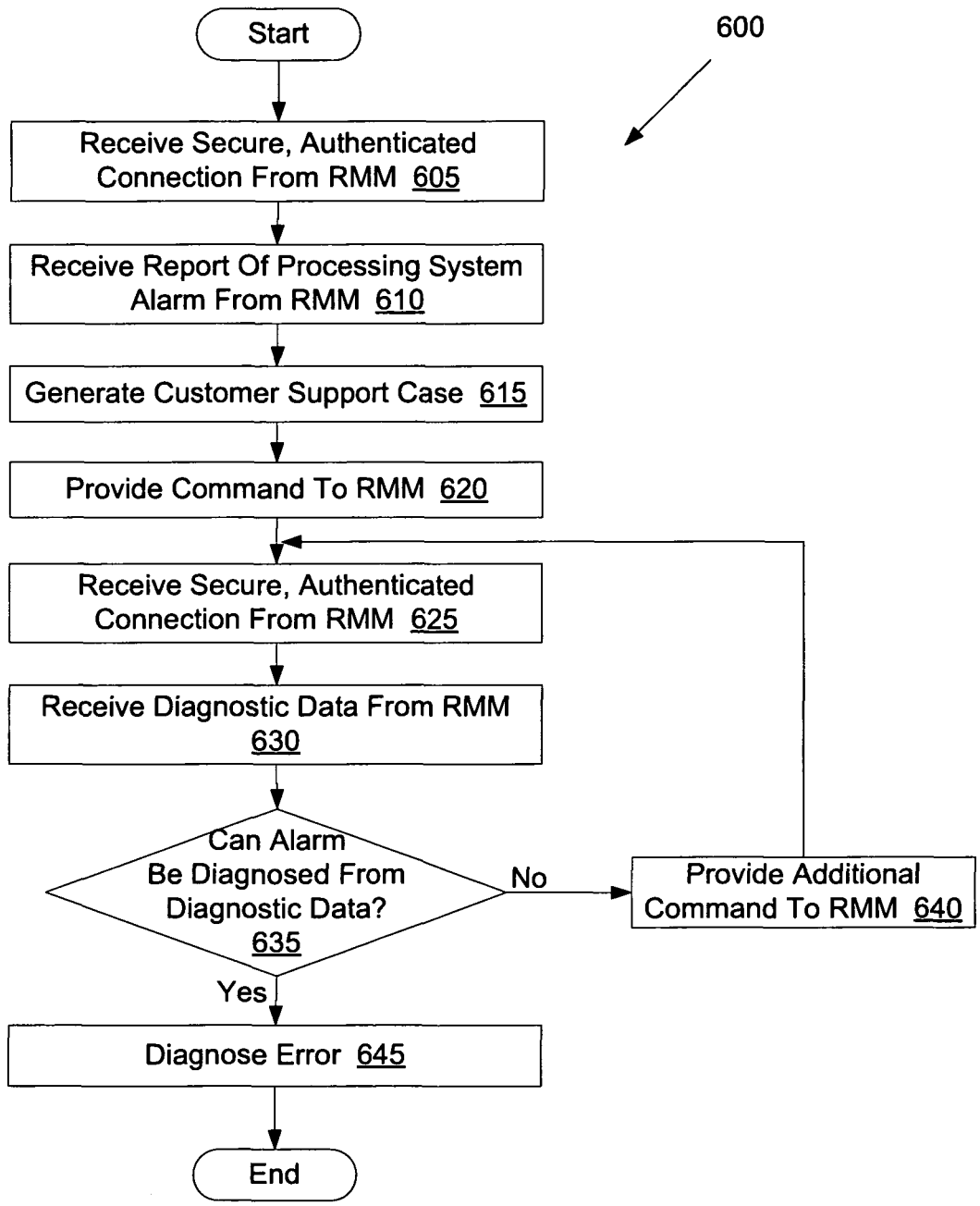
FIG. 6 is a flow diagram illustrating an embodiment of a process for providing remote automated support to a processing system such as a storage server.

FIG. 6 is a flow diagram illustrating an embodiment of a process 600 for providing remote automated support to a processing system such as a storage server. The process may be performed by processing logic that comprises hardware (e.g., circuitry, dedicated logic, programmable logic, microcode, etc.), software (e.g., instructions run on a processing device to perform hardware simulation), or a combination thereof. In one embodiment, process 600 is performed by support server 500 of FIG. 5.

Referring to FIG. 6, process 600 includes processing logic receiving a secure, authenticated connection from an RMM (block 605). A secure, authenticated connection may be made, for example, using SSL with login credentials. The connection may be established between a remote support agent of the RMM and a support server. At block 610, a report of an alarm that occurred on a processing system monitored by the RMM is received. The report may be received from a remote support agent of the RMM.

At block 615, a support case is generated. At block 620, a command is provided to the RMM. The command may include one or more scripts, and may direct a remote support agent of the RMM to gather diagnostic data such as log files, messages, core chunks, etc. The scripts, when executed by the RMM, may cause the RMM to gather log files, execute test procedures, request information from a storage server, etc.

At block 625, a second secure, authenticated connection is received from the RMM. The second secure, authenticated connection may be made, for example, using SSL with login credentials. At block 630, diagnostic data is received from the RMM (e.g., from a remote support agent of the RMM). For example, the remote support agent (e.g., remote support agent 250 of FIG. 2) may upload the diagnostic data to the storage server. The diagnostic data may be data that was collected by a remote support agent in response to the command.

At block 635, processing logic (e.g., diagnoser 505 of FIG. 5) determines whether the alarm can be diagnosed from the received diagnostic data. In one embodiment, processing logic compares the received diagnostic data to diagnostic data of previously diagnosed alarms that is stored in an alarm data store (e.g., alarm data store 515 of FIG. 5). In another embodiment, processing logic runs scripts that attempt to match the received diagnostic data to specific categories of problems and/or to specific problems. The scripts may be run by a diagnoser, and may cause the diagnoser to retrieve data from an alarm data store to make such comparisons. If the alarm can be diagnosed from the received diagnostic data, the process proceeds to block 645. If the alarm cannot be diagnosed from the received diagnostic data, the process proceeds to block 640.

At block 640, an additional command or commands are provided to the RMM. The additional commands may be provided to the RMM by placing them in a command queue. On a subsequent secure, authenticated established by the RMM, the RMM may retrieve the commands from the command queue. The process then proceeds to block 625.

At block 645, the alarm is diagnosed. The diagnosed alarm may then be compared to an alarm data store. If the alarm is new, it may be added to the alarm data store to facilitate quicker diagnosis of similar alarms in the future. Adding the alarm to the alarm data store may include adding the diagnostic data that was pertinent to the alarm to the data store in a new alarm entry. Thereby, future alarms caused by similar problems may be more easily diagnosed.

Figure 7:
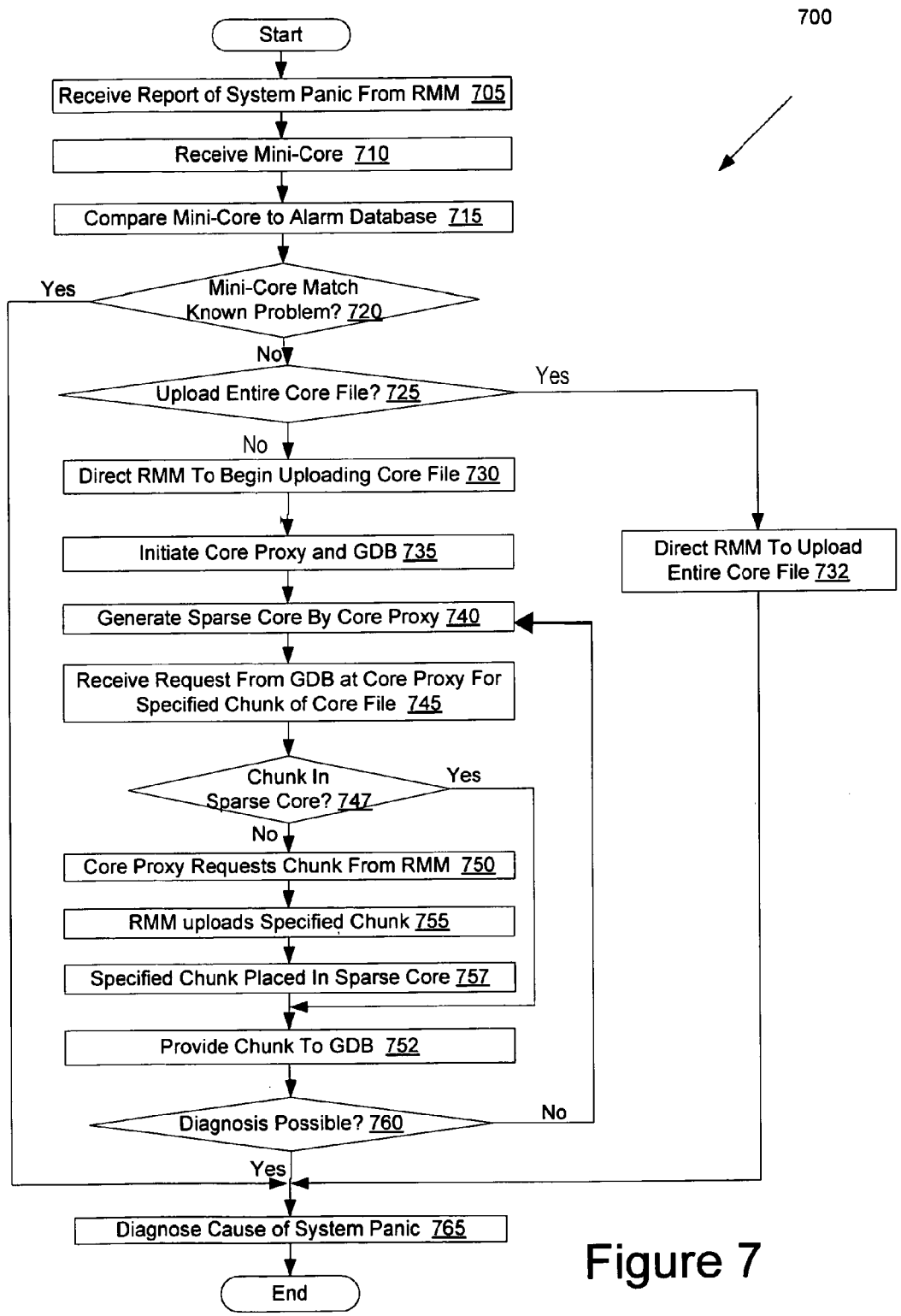
FIG. 7 is a flow diagram illustrating another embodiment of a process for providing remote automated support to a processing system such as a storage server.

FIG. 7 is a flow diagram illustrating another embodiment of a process 700 for providing remote automated support to a processing system such as a storage server. Process 700, when executed by processing logic, provides remote diagnosis of core files. The process may be performed by processing logic that comprises hardware (e.g., circuitry, dedicated logic, programmable logic, microcode, etc.), software (e.g., instructions run on a processing device to perform hardware simulation), or a combination thereof. In one embodiment, process 700 is performed by support server 500 of FIG. 5.

Referring to FIG. 7, process 700 includes processing logic receiving a report of a system panic (crash). In one embodiment, a support server (e.g., support server 500 of FIG. 5) receives the report of the system panic from a remote support agent (e.g., remote support agent 250 of FIG. 3) of an RMM upon the remote support agent establishing a secure, authenticated connection with the support server. Alternatively, the support server may receive the report from a processing system (e.g., storage server 300 of FIG. 3). The report may be received via email, HTTPS, SSL, or other communication protocol.

At block 710, a mini-core is received (e.g., from a remote support agent of an RMM). The mini-core is a signature of a core file that was dumped when the system panic occurred. At block 715, the min-core is compared to mini-cores stored in an alarm data store. Each of the mini-cores in the alarm data store represents a previously diagnosed system panic.

At block 720, processing logic determines whether the mini-core matches a stored mini-core in the alarm data store. If the mini-core matches one of the stored mini-cores, then it represents a known problem, and the process proceeds to block 765. If the mini-core does not match a stored mini-core in the alarm data store, it represents an unknown problem, and the process proceeds to block 725.

At block 725, processing logic determines whether to direct the RMM to upload the entire core file, or portions of the core file. If the RMM is to upload portions of the core file, the process continues to block 730. If the RMM is to upload the entire core file, the process continues to block 732, and processing logic directs the RMM to upload the entire core file.

At block 730, an RMM (e.g., a remote support agent of an RMM) is directed to begin uploading a core file, in response to which the RMM begins uploading chunks of the core file in sequential order. At block 735, processing logic initiates a core proxy and a debugger. At block 740, the core proxy generates a sparse core. The sparse core begins as an empty core file, and is populated by chunks of the actual core file as they are uploaded by the RMM.

At block 745, core proxy receives a request from the debugger to access a specified portion or portions (chunk(s)) of the core file. As the debugger analyzes the core file, it makes attempts to access chunks of the core file to examine those specific chunks. The core proxy intercepts such attempts, and at block 748 determines whether the requested chunk or chunks are present in the sparse core file (if they have already been uploaded). If the chunks are present in the sparse core file, the process proceeds to block 752. If the chunks are not present in the sparse core file, the process proceeds to block 750.

At block 750, the core proxy requests the specified chunk or chunks from the RMM. At block 755, the RMM uploads the specified chunk(s). Once the RMM uploads the specified chunks, it resumes uploading the chunks of the core file in sequential order. Once the specified chunks have been uploaded, the core proxy places them in the sparse core (block 757). The process then proceeds to block 752.

At block 752, the core proxy provides the requested chunk or chunks to the debugger. The debugger then examines the requested chunks and determines if a diagnosis is possible (block 760). If a diagnosis is not yet possible, the debugger requests additional chunks of the core file, and the process proceeds to block 745. If a diagnosis is possible, the process proceeds to block 765, and the cause of the system panic is diagnosed. The process then ends.

Figure 8:
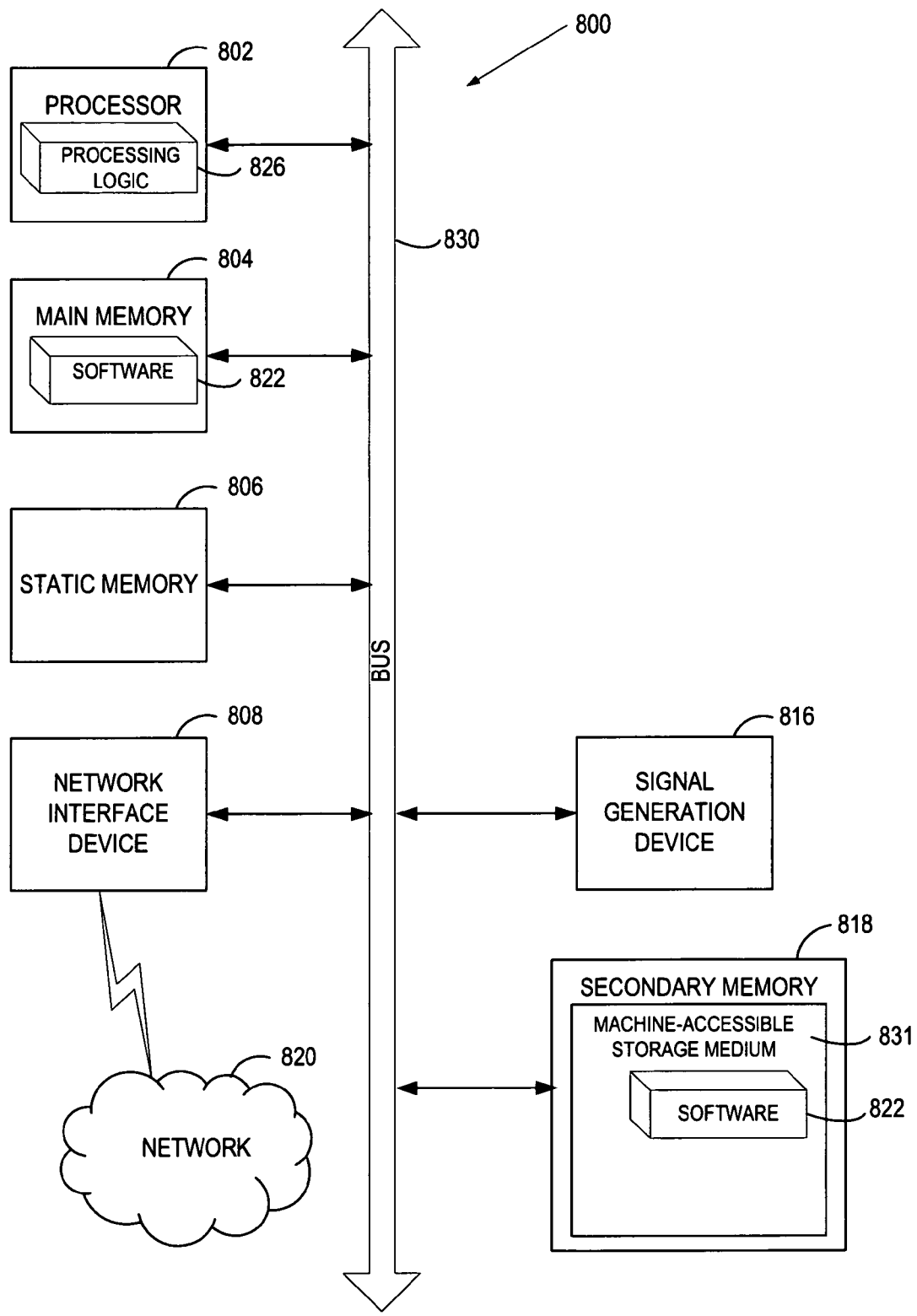
FIG. 8 illustrates a diagrammatic representation of a machine in the exemplary form of a computer system, in accordance with one embodiment of the present invention.

FIG. 8 illustrates a diagrammatic representation of a machine in the exemplary form of a computer system 800 within which a set of instructions, for causing the machine to perform any one or more of the methodologies discussed herein, may be executed. Computer system 800 may be representative of, for example, any of: support server 235, RMM 220, storage server 215, storage clients 265 or clients 280 of FIG. 2. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device and may represent, for example, a front end server, a back end server, a client, a network appliance, or any other computing device.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), and a static memory 806 (e.g., flash memory, static random access memory (SRAM), etc.), which may communicate with each other via a bus 830. Alternatively, the processing device 802 may be connected to memory 804 and/or 806 directly or via some other connectivity means.

Processing device 802 represents one or more general-purpose processing devices such as a microprocessor, central processing unit, or the like. More particularly, the processing device 802 may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 802 is configured to execute processing logic 826 for performing the operations and steps discussed herein.

The computer system 800 may further include a network interface device 808 and/or a signal generation device 816. It also may or may not include a video display unit (e.g., a liquid crystal display (LCD) or a cathode ray tube (CRT)), an alpha-numeric input device (e.g., a keyboard), and/or a cursor control device (e.g., a mouse).

The computer system 800 may or may not include a secondary memory 818 (e.g., a data storage device) having a machine-accessible storage medium 831 on which is stored one or more sets of instructions (e.g., software 822) embodying any one or more of the methodologies or functions described herein. For example, if the computer system 800 is a computer system of the support server 500, software 822 may include diagnoser 505, core proxy 520, debugger 530, alarm data store 515, etc. Such a computer system 800 may also be connected with a data store that includes the alarm data store 515 via the network 820. Moreover, the computer system 800 may be connected with one or more additional computer systems (e.g., of the RMM 300 and/or storage server 215) via the network 820. In another example, if the computer system 800 is a computer system of the RMM 300, software 822 may include remote support agent 250, data collector 320, scripts 325, etc. The software 822 may also reside, completely or at least partially, within the main memory 804 and/or within the processing device 802 during execution thereof by the computer system 800, the main memory 804 and the processing device 802 also constituting machine-accessible storage media. The software 822 may further be transmitted or received over a network 820 via the network interface device 808.

While the machine-accessible storage medium 831 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A processing system comprising:
a processor;
sensors that collect data about environmental state of the processing system;
presence detectors that collect data about presence or absence of components in the processing system;
a first network interface to a storage subsystem;

a second network interface; and a remote management module that operates independently of the processor, the remote management module comprising:

a data collector configured to monitor condition of the processing system via a plurality of interfaces, wherein the data collector being configured to monitor condition of the processing system via the plurality of interfaces comprises the data collector configured to, collect data from the sensors and the presence detectors via at least a first set of interfaces of the plurality of interfaces collect data from an operating system of the processing system via a second set of one or more interfaces of the plurality of interfaces, determine whether an alarm or error occurs in the processing system based, at least in part, on the collected data, maintain one or more logs pertaining to the condition of the processing system, including indication of any determined alarm or error;

a remote support agent, connected with the data collector, configured to, periodically establish network connections with a support server at a time interval via a third network interface of the remote management module, communicate to the support server a determined alarm or determined error of the data processing system via one of the periodically established network connections, decrease the time interval for the periodic establishment of network connections with the support server after communicating a determined alarm or determined error of the data processing system, and communicate information corresponding to the determined alarm or the determined error to the support server via the one or more network connections periodically established at the decreased time interval.

2. The processing system of claim 1, wherein the remote management module includes an additional processor that is powered by a standby voltage, and wherein the remote management module is capable of communicating with the support server even when the processor is disabled.

3. The processing system of claim 1, wherein the remote support agent is configured to request additional diagnostic data from the processor that is not available to the remote management module upon executing the command at the remote management module.

4. The processing system of claim 1, wherein:

the remote support agent is configured to determine that an alarm indicates a system crash of the processing system, to obtain a signature of a core file that was generated by the processing system during the system crash via one of the plurality of interfaces, and to transmit the signature of the core file to the support server.

5. The processing system of claim 4, wherein the remote support agent is further configured to obtain chunks of the core file as specified by commands received from the support server, wherein the remote support agent configured to communicate information corresponding to the determined alarm or the determined error to the support server via the one or more network connections periodically established at the decreased time interval comprises the remote support agent configured to transmit the obtained chunks of the core file via the one or more network connections periodically established at the decreased time interval.

6. The processing system of claim 1, wherein remote management module further comprises a machine readable storage medium that hosts a plurality of scripts and the remote support agent is also configured to run those of the plurality of scripts specified by commands received from the support serve.

7. The processing system of claim 1, wherein the remote support agent is further configured to run a script that is received from the support server through at least one of the network connections periodically established at the decreased time interval, and to store the script upon receiving the script.

8. The processing system of claim 7, wherein the remote management module also comprises a security policy and the remote support agent is configured to check the script against the security policy.

9. The processing system of claim 1:

wherein the data collector configured to determine whether an alarm or error occurs in the processing system based, at least in part, on the collected data comprises the data collector being configured to compare the collected data to one or more threshold values, and to determine whether an alarm has occurred based on the comparison.

10. A storage server comprising:

sensors that collect data about environmental state of the storage server;

presence detectors that collect data about presence or absence of components in the storage server;

a storage interface through which to access a plurality of mass storage devices;

a first network interface through which to communicate with a plurality of network clients;

a processor to manage the storage interface and the first network interface, and to otherwise control the storage server; and a remote management module comprising control circuitry that operates independently of the processor and one or more machine readable storage media having instructions stored therein, the instructions executable by the control circuitry to cause the remote management module to, collect data from the sensors and the presence detectors via a first set of interfaces internal to the storage server;

collect data from an operating system of the processing system via a second set of one or more interfaces internal to the storage server, determine whether an alarm or error occurs in the processing system based, at least in part, on the collected data, maintain one or more logs pertaining to the condition of the storage server, including indication of any determined alarm or error;

periodically establish at a time interval network connections with a support server via a second network interference communicate to the support server a determined alarm or determined error of the data processing system via one of the periodically established network connections, decrease the time interval for the periodic establishment of network connections with the support server after communicating a determined alarm or determined error of the data processing system, and communicate information corresponding to the determined alarm or the determined error to the support server via the one or more network connections periodically established at the decreased time interval.

11. The storage server of claim 10, wherein the remote management module includes an additional processor that is powered by a standby voltage, and wherein the remote management module is capable of communicating with the support server even when the processor is disabled.

12. The storage server of claim 10, wherein the remote support agent is configured to request additional diagnostic data from the processor that is not available to the remote management module upon executing the commands at the remote management module.

13. The storage server of claim 10, wherein the instructions comprises instructions executable by the control circuitry to cause the remote management module to:
   determine that an alarm indicates a system crash of the storage server;
   obtain a signature of a core file that was generated by the storage server during the system crash via the second set of one or more interfaces, and
   transmit of the signature of the core file to the support server.

14. A method comprising:
   periodically establishing, at a first time interval by a remote management module at a storage server, network connections with a support server that is remote from the storage server;
   collecting, by the remote management module, data about hardware of the storage server and data from an operating system of the storage server, wherein said collecting is via a plurality of interfaces internal to the storage server that provides the remote management module access to the data;
   determining, by the remote management module, an alarm for the storage server based, at least in part, on the collected data;
   reporting, by the remote management module, the alarm to the support server via one of the network connections established after the alarm is determined;
   after reporting the alarm to the support server and in accordance with a command from the support server, periodically establishing, by the remote management module, network connections with the support server at a second time interval that is shorter than the first time interval;
   communicating, by the remote management module, information corresponding to the alarm to the support server via the network connections periodically established at the second time interval.

15. The method of claim 14 further comprising restoring the periodic establishing of network connection with the support server to the first time interval after a cause of the alarm is diagnosed by the support server.

16. The method of claim 14 further comprising:
   obtaining a signature of a core file, wherein the storage server generated the core file because of a system crash; and
   wherein said reporting the alarm to the support server comprises transmitting the signature of the core file to the support server.

17. The method of claim 15, wherein said communicating information corresponding to the alarm to the support server comprises:
   transmitting a different chunk of the core file to the support server, wherein each chunk of the core file is transmitted via a different one of the network connections periodically established at the second time interval.

18. The method of claim 14 further comprising:
   determining a configuration of the storage server at start up;
   reporting the configuration of the storage server to the support server via at least one of the network connections periodically established at the first time interval; and
   reporting changes to the configuration of the storage server to the support server via at least one of the network connections periodically established at the first time interval.

* * * * *